United States Patent [19]

Blackstone

[11] Patent Number: 6,123,010

[45] Date of Patent: Sep. 26, 2000

[54] RECHARGEABLE MOBILE BEVERAGE MAKER WITH PORTABLE MUG AND CARRYING CASE

[76] Inventor: Michael Alexander Blackstone, 1155 Bay Highland Dr., Annapolis, Md. 21403

[21] Appl. No.: 09/268,991

[22] Filed: Mar. 16, 1999

Related U.S. Application Data

[60] Provisional application No. 60/078,505, Mar. 18, 1998.

[51] Int. Cl.[7] .................................................. A47J 31/00
[52] U.S. Cl. ................................. 99/284; 99/279; 99/290
[58] Field of Search ............................ 99/279, 284, 304, 99/307, 290; 126/609, 610

[56] References Cited

U.S. PATENT DOCUMENTS

| | | | |
|---|---|---|---|
| 5,123,335 | 6/1992 | Aselu | 99/304 X |
| 5,233,914 | 8/1993 | English | 99/307 X |
| 5,274,736 | 12/1993 | Rohr, Jr. | 99/304 X |

*Primary Examiner*—Reginald L. Alexander

[57] ABSTRACT

Portable hot beverage machine. This device also has a detachable beverage mug which can be operated independently from the beverage maker. Both units have self-contained carrying cases and may be powered by electric, rechargeable battery pack, solar power, a wind up generator, and a cigarette lighter plug. safety features include removable overflow reservoir will spill prevention lip, on and off switch with built in timer, insulated receptacle to hold the liquids, and mounting brackets to stabilize units.

3 Claims, 5 Drawing Sheets

RECHARGEABLE MOBILE BEVERAGE MAKER WITH PORTABLE MUG AND CARRYING CASE

CROSS-REFERENCE TO RELATED APPLICATIONS

This application claims the benefit of U.S. Provisional Application Ser. No. 60/078,505, filed Mar. 18, 1998.

BACKGROUND OF THE INVENTION

This invention relates to coffee makers, and more specifically to portable coffee makers for use indoors or outdoors, and for traveling.

The modem coffee maker is relevant to the invention. The coffee maker is the most popular way of brewing fresh coffee. The modem coffee maker has had no phenomenal changes beyond improved functioning of the basic parts of the machine. The point is that coffee is produced one of two ways, either by a gravity flow of water through coffee beans or a compression of the beans and force flow of water there through. The machine used in either case is normally run by electricity and typically mounted upon a household kitchen shelf or store shelf. The portability and versatility of the device is severely limited as well as the ability to produce the coffee without an electrical source.

SUMMARY OF THE INVENTION

A coffee maker in accordance with this invention is powered by battery, solar energy, electricity, or wind up generator. This coffee maker is rechargeable and can be plugged into a cigarette lighter of an automobile. Thus, adding to the portability and versatility of the device.

This machine has an insulated coffee receptacle, filter, retractable filter drawer, and a moveable refill water hatch. The machine is also equipped with a portable mug that may be operated separate from the rechargeable mobile machine. A heating element is located inside the mug which heats the beverage. This special mug has a rechargeable battery, a solar panel, or also may be plugged into a cigarette lighter or electric outlet, and has a hand cranked generator.

The mobile, rechargeable hot beverage machine has a rechargeable battery pack, which allows various users to run the unit from the battery. Boaters, truckers, construction workers, farmers, and hotel travelers are just some of the groups that may benefit from the versatility of the invention. Campers may opt to power the unit by solar power or wind up generator. Bikers and motorcyclists may choose to mount the mobile rechargeable hot beverage mug on their vehicles. Users may also elect to screw a specially fitted lid on the mug, which may be taken along with them while traveling. Hikers may choose to carry the mobile rechargeable hot beverage mug inside of their backpacks or carry it in their hands.

The mobile rechargeable hot beverage machine has numerous innovative features such as; a light weight design and accommodation of a standard mug; a handy carrying case for transporting the mobile machine; it is convenient and cost effective.

An objective of the invention is to provide a portable machine that can make several types of fresh beverages at a push of a button.

Another objective of the invention is to provide a portable rechargeable beverage mug that is convenient and affordable for those who work on airplanes, on the road, construction sites, offices, are commuting, camping, biking, motorcycling, boating, traveling, and farming so they can easily make fresh hot beverages.

DETAILED DESCRIPTION OF THE INVENTION

With reference not to the drawings a portable and rechargeable hot beverage making machine embodying the principles and concepts of the present invention will be described.

Figure 1:
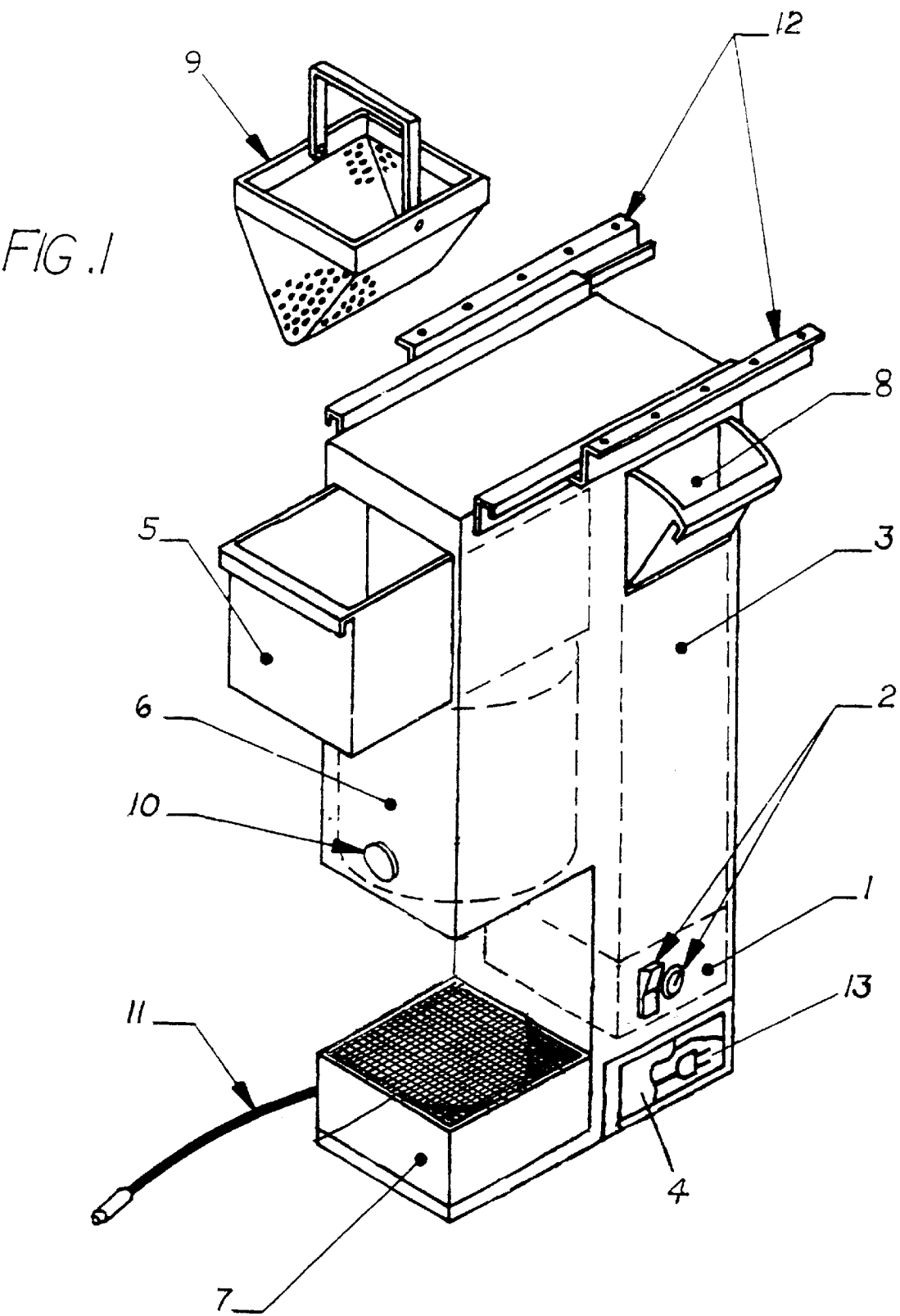
FIG. 1 is a perspective view of the beverage making machine.

FIG. 1 illustrates the beverage making machine wherein a heating element 1 is located underneath the water reservoir 3 and its function is to heat liquid located in the water reservoir 3. On and off switch with built in timer 2 turns the rechargeable mobile machine off and on. Water reservoir 3 holds liquids for the rechargeable mobile machine. A detachable rechargeable battery pack with compartment 4 provides portable battery power for the mobile hot beverage machine. A filter drawer 5 holds a removable filter basket 9. An insulated receptacle 6 keeps liquids warm and stores hot infused beverages. Overflow reservoir 7 catches excess liquids. Refill hatch 8 provides an entrance where liquids are added to the portable hot beverage machine. Dispenser button 10 regulates the flow of hot beverages out of the insulated receptacle 6. Cigarette lighter plug outlet 11 provides for connection of the machine to a vehicle cigarette lighter. Optional mounting brackets 12 for the machine secures the machine for fixed operation. Power cord 13 allows the machine to be operated electrically.

Figure 2:
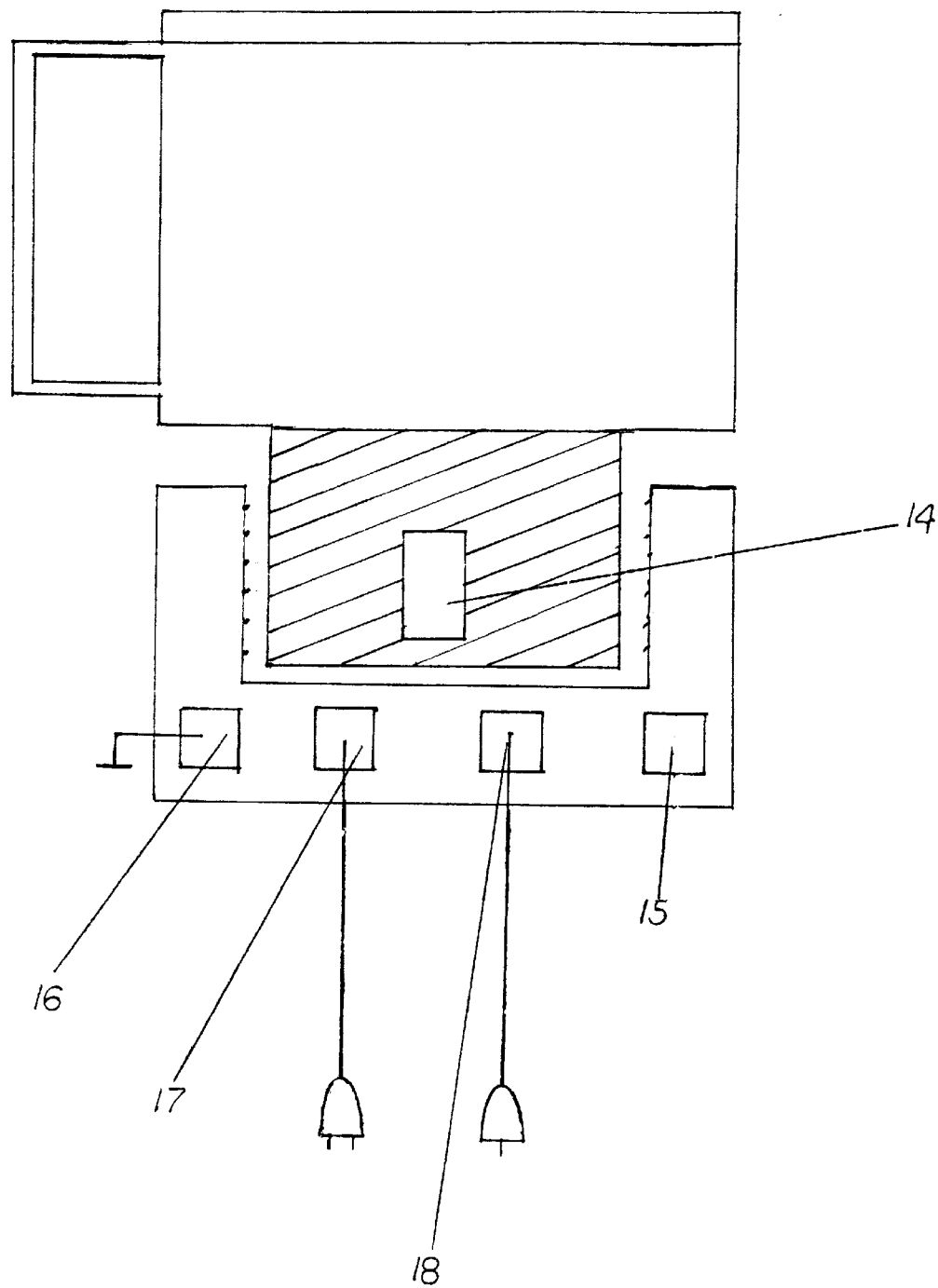
FIG. 2 is a perspective view of the portable mobile mug which cooperates with the beverage making machine.

FIG. 2 illustrates the portable mobile mug which can be operated separately from the rechargeable hot beverage machine. The following components are part of the mug. Heating element 14 is located at the base of the mug and heats liquids therein. Detachable rechargeable battery pack 15 provides battery power for the mug heating element 14. Wind up generator 16 produces electrical power to the heating element 14 by turning a crank handle. Electric power cord jack 17 of the mug can be plugged into any electrical outlet for power. Cigarette lighter jack 18 of the mug can be plugged into a cigarette lighter for power to the heating element 14.

Figure 3:
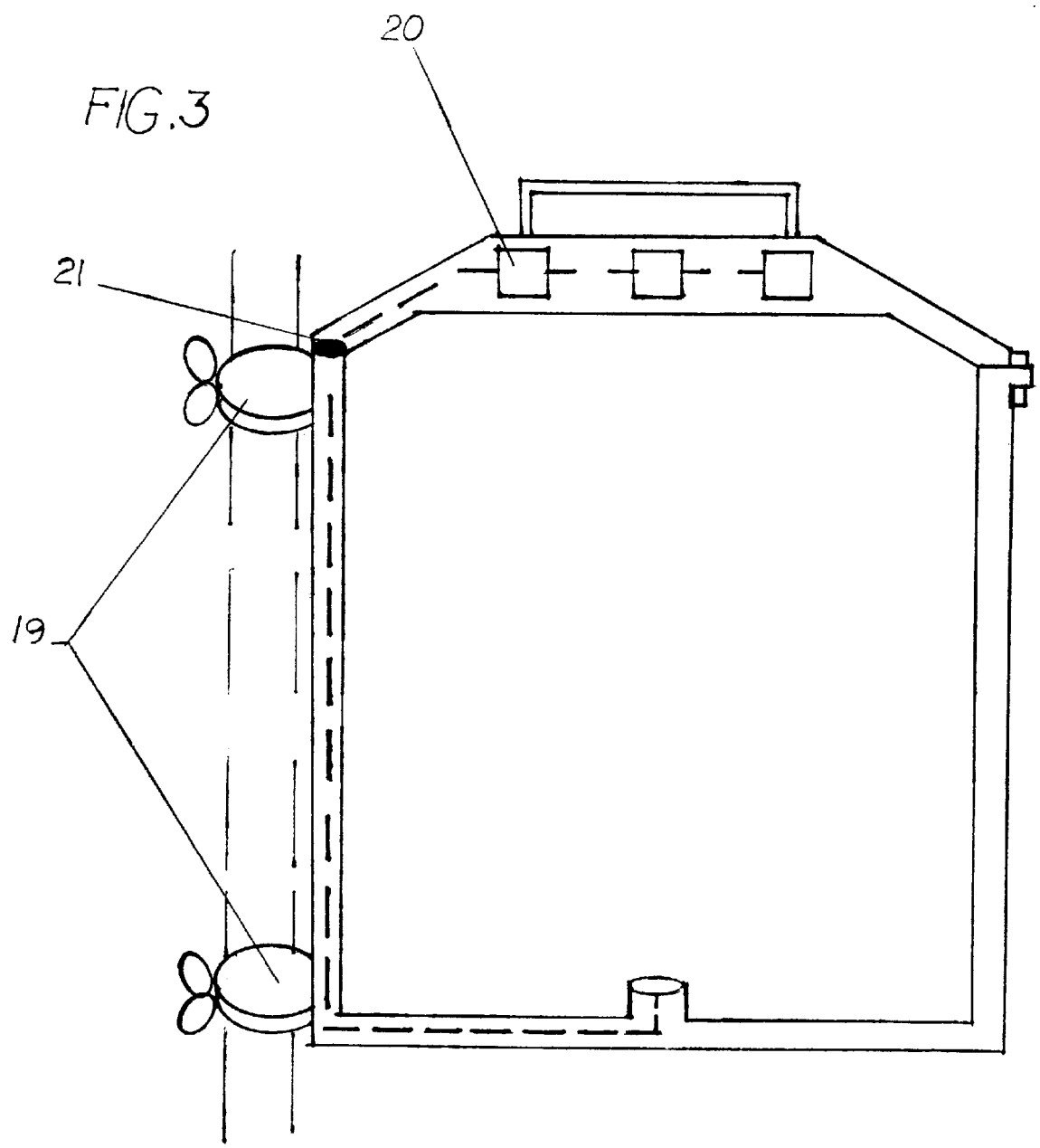
FIG. 3 is a perspective view of the carrying case for the mug.

FIG. 3 illustrates the carrying case for the mobile mug. The mug fits inside the case, while the case has solar panels 20 at a top thereof which convert sunlight to electrical energy to warm a liquid within the mug. Mobile mug case brackets 19 hold the mug case in a fixed position. Hinges 21 attach the solar panels 20 to the mug carrying case.

Figure 4:
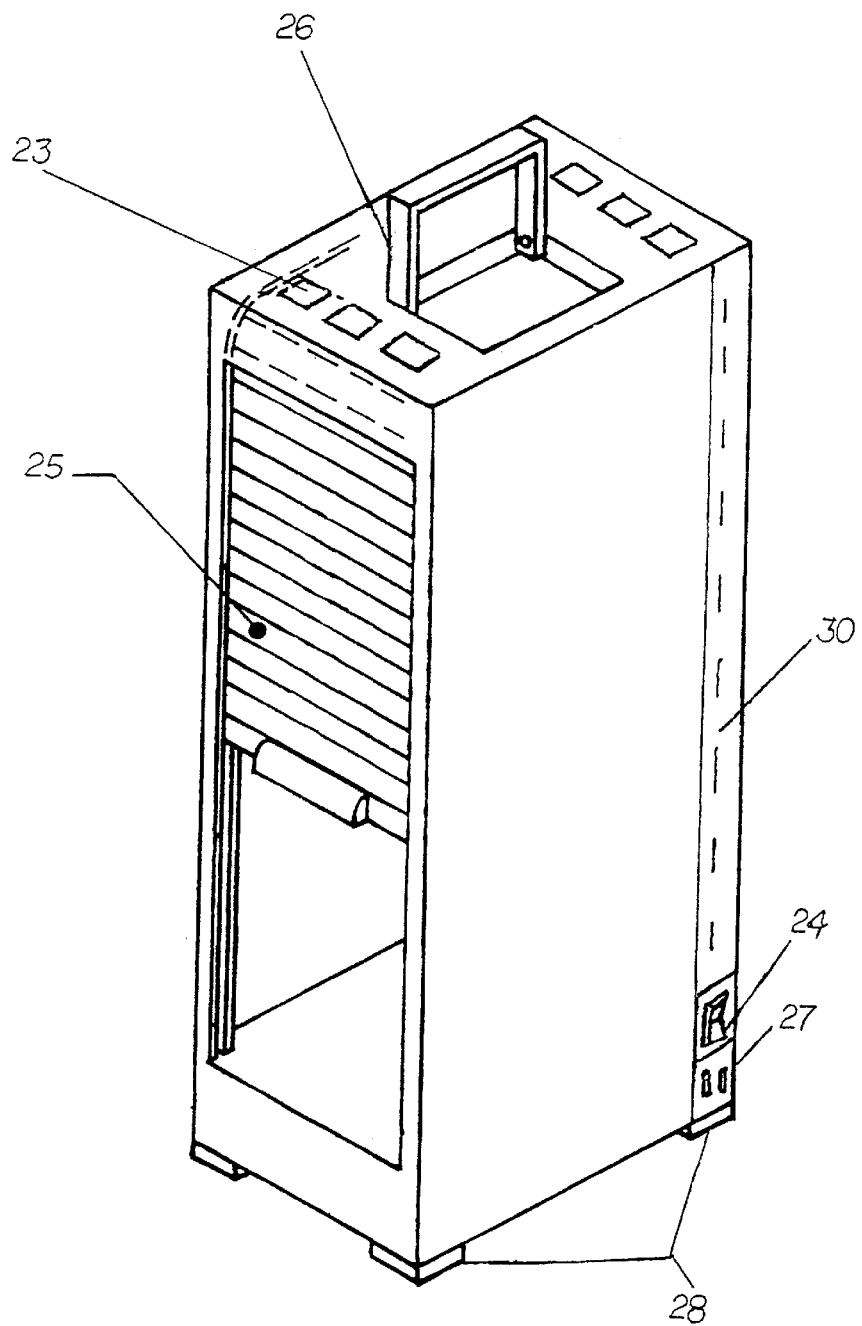
FIG. 4 is a perspective view of the carrying case for the beverage making machine.

FIG. 4 illustrates the carrying case for the hot beverage machine. Solar panel top 23 converts sun light to electrical energy to heat liquids in a mug. On and off switch 24 controls power for the hot beverage machine. Roll-up door 25 seals hot beverage machine inside the carrying case. Recessed retractable carrying handle 26 located on top of the carrying case. Electric wire 30 carries power from solar panels 23 to a power plug outlet socket 27. Cushioned feet 28 provide support for the carrying case.

Figure 5:
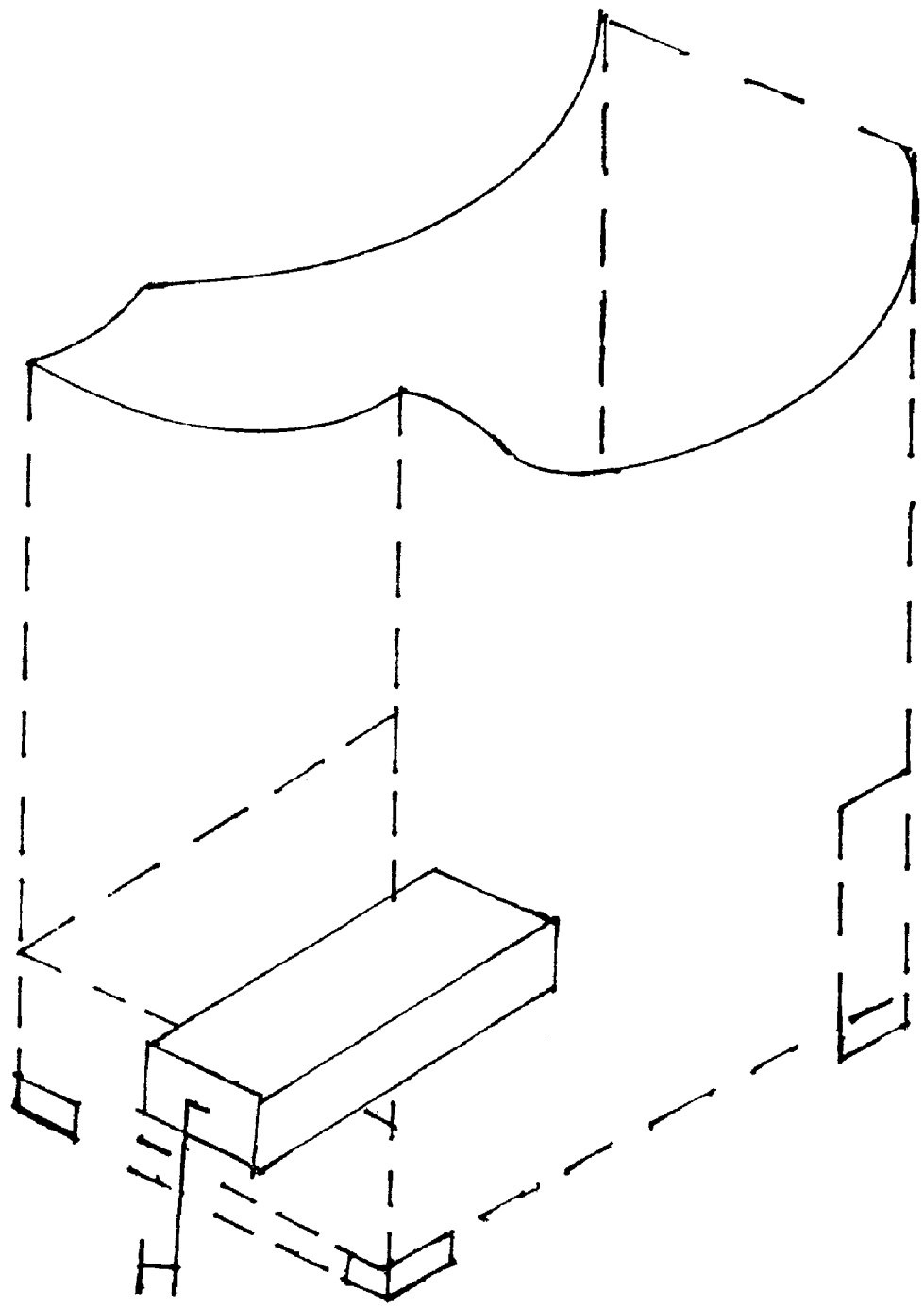
FIG. 5 shows the hand cranked generator.

FIG. 5 illustrates the hand cranked generator for the hot beverage machine for producing power. The generator can be mounted on the bottom of the carrying case of the mobile beverage machine.

The detailed descriptions of the preferred embodiment have been provided. It is to be understood however that the present invention may be embodied in various forms. Therefore, specific details disclosed here are not to be interpreted as limiting but rather as a basis for the claims and as a representative basis for teaching one skilled in the art to employ the present invention in virtually an appropriately system structure or manner.

I claim:

1. A mobile hot beverage machine that can prepare more than one hot beverage comprising: a housing including a water reservoir; a heating element mounted below said water reservoir; a power control switch mounted on said housing for controlling power to said heating element; a removable filter basket mounted within a retractable filter basket drawer at a top portion of said housing; an insulated beverage storage container mounted below said filter basket and filter basket drawer, for containing a brewed beverage; an liquids overflow reservoir mounted at a bottom portion of said housing; a beverage dispensing switch for regulating the flow of beverages from said beverage storage container; power generating means, said generating means including a rechargeable battery, electrical power cord, cigarette lighter plug, and separate wind up generator and mounted solar panels all of which are capable of use with the beverage machine for providing power to said heating element; and a portable mug for receiving brewed beverages from said storage container, said mug including a heating element mounted in a bottom thereof for providing heat to a beverage within the mug when used away from the beverage machine.

2. The mobile hot beverage machine of claim 1, wherein there is provided a carrying case for said machine, the carrying case including a retractable door; solar panels mounted atop of said case and power outlet means attached thereto for carrying electricity from said panels.

3. The mobile hot beverage machine of claim 2, wherein the wind up generator is mountable at the bottom of said carrying case.

* * * * *